No. 896,557. PATENTED AUG. 18, 1908.
I. C. & D. W. LESH.
BEET HARVESTING MACHINE.
APPLICATION FILED MAY 6, 1908.
2 SHEETS—SHEET 2.
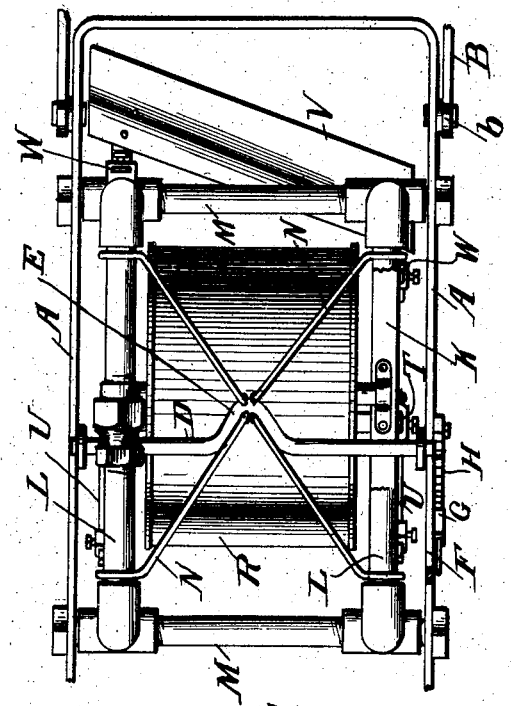
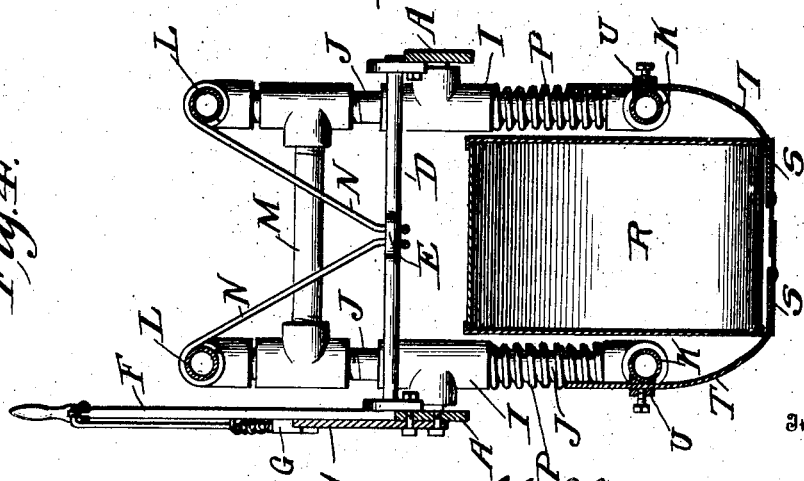

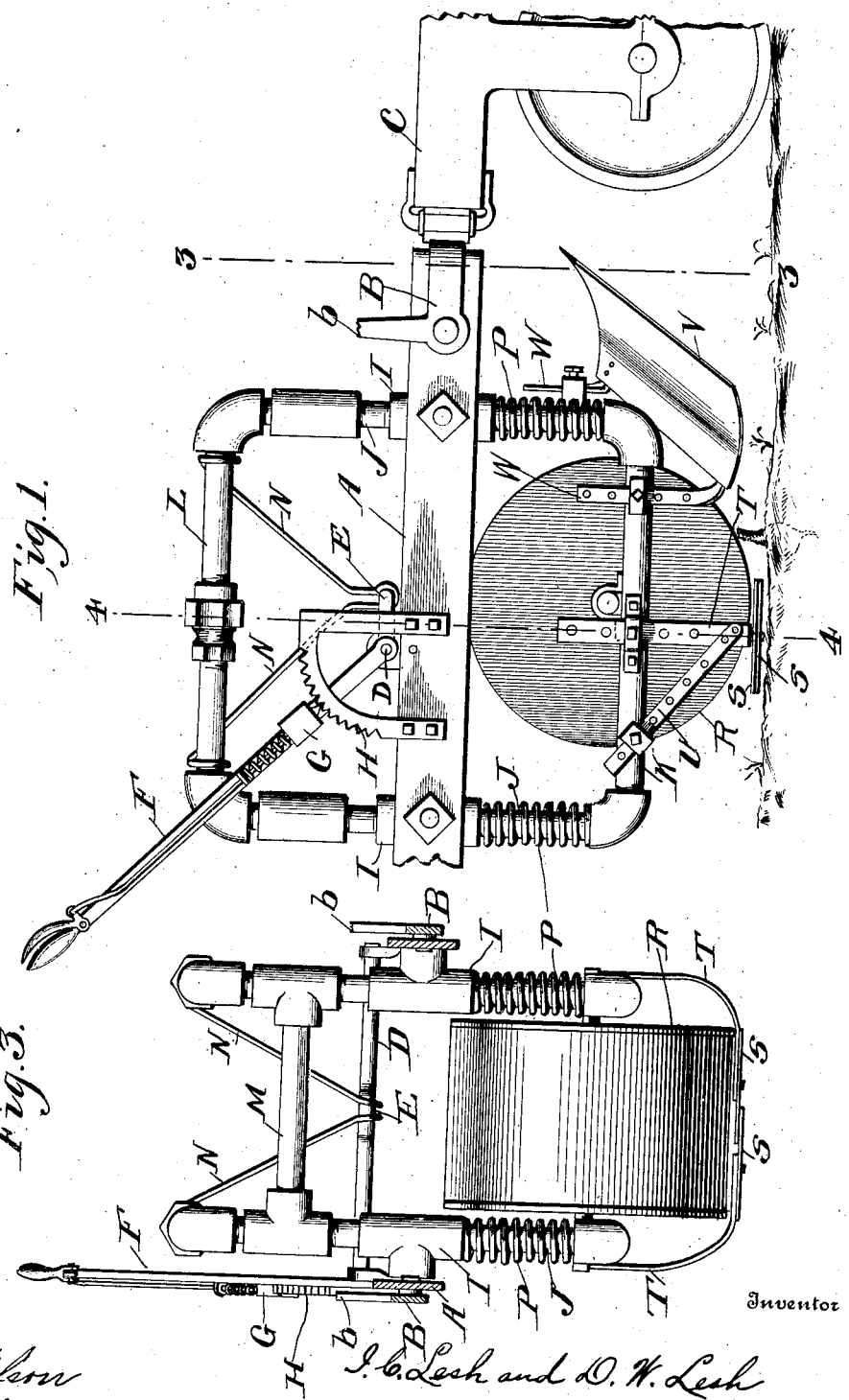

UNITED STATES PATENT OFFICE.

IRA C. LESH AND DANIEL W. LESH, OF AULT, COLORADO.

BEET-HARVESTING MACHINE.

No. 896,557.  Specification of Letters Patent.  Patented Aug. 18, 1908.

Application filed May 6, 1908. Serial No. 431,254.

*To all whom it may concern:*

Be it known that we, IRA C. LESH and DANIEL W. LESH, citizens of the United States, residing at Ault, in the county of Weld and State of Colorado, have invented new and useful Improvements in Beet-Harvesting Machines, of which the following is a specification.

Our invention relates to beet-harvesting machines, and is designed more particularly as an improvement upon the beet harvesting machine constituting the subject matter of the Letters-Patent granted to one of us, namely Ira C. Lesh, under date of July 12, 1904, No. 765,090.

The object of our invention is to provide in a machine of the kind stated, improved means for removing the tops of beets and delivering said tops to the side of a row, and improved means for removing the crowns of the beets and such top remnants as may remain thereon, precedent to the taking of the beets from the ground.

With the foregoing in mind, the invention will be fully understood from the following description and claims when the same are read in connection with the drawings, accompanying and forming part of this specification, in which:

Figure 1 is a side elevation of so much of a beet harvester as is necessary to illustrate the construction constituting the best practical embodiment of our invention of which we are cognizant. Fig. 2 is a plan view of the improvements. Fig. 3 is a transverse section taken in the plane indicated by the line 3—3 of Fig. 1, looking rearwardly but with the cutter V omitted. Fig. 4 is a detail transverse section taken through our improvements on the line 4—4 of Fig. 1.

Similar letters designate corresponding parts in all of the views of the drawings, referring to which:

A is the forward portion of the main frame of a beet harvesting machine. The said frame is designed to be supported by rear wheels (not shown) in the manner disclosed in the aforesaid Letters-Patent, and on its forward portion is pivotally mounted a yoke B to which is connected a wheeled truck C the office of which is to support the forward end of the main frame. The yoke B is provided with upwardly extending arms $b$ and is designed to be swung vertically and adjustably fixed, preferably in the manner disclosed in said patent, with a view of positioning the forward end of the main frame A at various distances above the ground to meet different conditions. At this point we desire it understood that while we prefer to support the main frame A in the manner stated, we do not wish to be understood as confining ourselves to the same, inasmuch as the main frame A may be supported above the ground in any suitable manner without involving departure from the scope of our present invention as defined in the claims appended.

In the present embodiment of our invention we journal in the side bars of the main frame A a transverse rock shaft D having a crank E at an intermediate point of its length, and to one end of the said rock shaft we fix a hand lever F which carries a detent G designed to be engaged with a segmental rack H with a view of adjustably fixing the crank on the rock shaft in various positions for a purpose presently set forth. We also provide the side bars of the main frame A with vertically disposed boxes I. These boxes I are fixed to the inner sides of said side bars and receive and guide the vertical bars J of the vertically adjustable frame comprised in our improvements. In addition to the said vertical bars J of which there are four, the vertically adjustable frame comprises lower horizontal bars K disposed longitudinally and each connecting the lower ends of two vertical bars, upper longitudinally disposed bars L each connecting the upper ends of two vertical bars, and upper cross-bars M each connecting the vertical bars at one end of the vertically adjustable frame. We prefer to form the said frame of gas pipe sections connected through the medium of unions such as illustrated, but it is obvious that the said frame may be formed of any other available material without affecting our invention. The upper side portions of the said vertically adjustable frame are connected through links N with the crank E of the rock shaft D, and hence it will be manifest that when the hand lever F is moved in one direction the vertically adjustable frame will be moved downward with respect to the main frame A, while when said lever F is moved in the opposite direction the vertically adjustable frame will be raised with respect to the main frame.

With a view of yieldingly holding the parts carried by the vertically adjustable frame to their work, we provide the coiled expansion springs P. These springs P surround the vertical bars J and are interposed between the lower ends of the boxes I and the lower unions or other abutments provided on the lower portions of the vertical bars, and from this it follows that when the vertically adjustable frame is raised, the springs will be compressed, and when the vertically adjustable frame is lowered the springs will expand and serve to hold the cutting devices on the frame to their work and at the same time will steady the vertically adjustable frame incidental to the use of the machine.

Mounted between the lower longitudinal bars K of the vertically adjustable frame is a roller R. This roller which is hollow for the sake of lightness, extends below and is arranged to freely turn between the said bars K with a view of regulating the amount of tops or crowns to be cut from the beet roots. In performing this function, the roller coöperates with horizontally disposed cutting disks S which are lapped below the roller and are carried by hangers T, connected, preferably in an adjustable manner, to the lower longitudinal bars K and maintained against casual movement in the direction of the length of the machine through the medium of inclined braces U which are also preferably connected in an adjustable manner to the frame bars K.

By virtue of the construction just described it will be understood that the disks S may be adjustably fixed at various distances below the periphery of the roller R, this in order to enable the said disks to operate to the best advantage in removing the crowns and such top remnants as may remain on the beets after the major portions of the tops are removed by the initial cutter V. The said initial cutter V is provided with hangers W, and one of these hangers is connected, preferably in an adjustable manner, to a forward vertical bar J at one side of the vertically adjustable frame, while the other hanger is similarly connected to one of the lower longitudinal bars K of the said vertically adjustable frame, whereby it will be seen that the said initial cutter V is disposed obliquely across the machine and hence is adapted to make a drawn and easy cut of the tops, and is also adapted to deliver the tops that it cuts to one side of the path of the machine and in that way lessen the liability of the said tops being taken up with the beets when the latter are removed from the ground.

In the practical operation of the machine equipped with our improvements, the machine is drawn by a team of draft animals hitched to the truck C along a row of beets, and as the machine passes over the beets the cutter V removes the major portions of the tops and delivers such portions to one side of the row, after which the disks S remove the crowns of the beets and such top remnants as remain thereon. With this done the beets are taken up from the ground in the manner disclosed in the aforesaid Letters-Patent or in any other suitable manner.

Having described our invention, what we claim and desire to secure by Letters-Patent, is:

1. The combination in a beet harvester, of a supported frame, a vertically adjustable frame carried by and guided in the first mentioned frame, springs interposed between the first mentioned frame and lower abutments on the second mentioned frame for yieldingly holding the latter against upward movement, manual means on the first mentioned frame for raising the vertically adjustable frame against the action of said springs, means for adjustably fixing said manual means, a hollow roller carried by the vertically adjustable frame, an initial cutter carried by said frame and arranged in front of said hollow roller, and cutting means carried by the vertically adjustable frame and disposed below the hollow roller.

2. The combination in a beet harvester, of a supported frame having spaced side bars and vertically disposed boxes thereon, a transverse rock shaft journaled on the said side bars of the frame and having a crank at an intermediate point of its length and also having a lever, coöperating means on the frame and lever for adjustably fixing the latter, a vertically adjustable frame having vertical bars movable in the boxes of the first named frame, means connecting the upper portion of the vertically adjustable frame and the said crank of the rock shaft, springs surrounding the vertical bars of the vertically adjustable frame and interposed between the said boxes and abutments on the vertical bars below the boxes, an initial cutter arranged diagonally of the harvester and carried by the said vertically adjustable frame, a roller carried by and movable vertically with the vertically adjustable frame and disposed in rear of the initial cutter, and lapped disks disposed below the said roller and connected through vertically adjustable means with the said vertically adjustable frame.

In testimony whereof we have hereunto set our hands in presence of two subscribing witnesses.

IRA C. LESH.
DANIEL W. LESH.

Witnesses:
 E. T. DUFFEY,
 A. T. WILSON.